(12) United States Patent
Deane

(10) Patent No.: US 6,888,587 B2
(45) Date of Patent: May 3, 2005

(54) LIQUID CRYSTAL DISPLAYS

(75) Inventor: Steven C. Deane, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 140 days.

(21) Appl. No.: 10/008,111

(22) Filed: Nov. 8, 2001

(65) Prior Publication Data

US 2002/0126235 A1 Sep. 12, 2002

(30) Foreign Application Priority Data

Nov. 28, 2000 (GB) .............................................. 0028877

(51) Int. Cl.⁷ .............................................. G02F 1/136
(52) U.S. Cl. .............................. 349/44; 349/38; 349/39; 349/43; 349/111; 349/110
(58) Field of Search ................................ 349/44, 42, 43, 349/38, 110, 111, 39, 95

(56) References Cited

U.S. PATENT DOCUMENTS

| | | | | |
|---|---|---|---|---|
| 4,821,092 A | * | 4/1989 | Noguchi | 257/10 |
| 4,956,680 A | * | 9/1990 | Tanaka et al. | 257/20 |
| 5,121,237 A | | 6/1992 | Ikeda et al. | 359/67 |
| 5,641,974 A | * | 6/1997 | den Boer et al. | 257/59 |
| 5,703,668 A | | 12/1997 | Shin | 349/110 |
| 5,781,254 A | | 7/1998 | Kim et al. | 349/44 |
| 5,818,550 A | * | 10/1998 | Kadota et al. | 349/43 |
| 5,844,646 A | * | 12/1998 | Yanai | 349/110 |
| 5,943,107 A | * | 8/1999 | Kadota et al. | 349/44 |
| 5,990,491 A | * | 11/1999 | Zhang | 257/57 |
| 5,990,542 A | * | 11/1999 | Yamazaki | 257/642 |
| 6,057,904 A | * | 5/2000 | Kim et al. | 349/143 |
| 6,163,055 A | * | 12/2000 | Hirakata et al. | 257/347 |
| 6,281,552 B1 | * | 8/2001 | Kawasaki et al. | 257/350 |
| 6,297,862 B1 | * | 10/2001 | Murade | 349/44 |
| 6,388,721 B1 | * | 5/2002 | Murade | 349/44 |
| 6,501,097 B1 | * | 12/2002 | Zhang | 257/72 |
| 6,525,788 B1 | * | 2/2003 | Nakagawa et al. | 349/4 |
| 6,556,265 B1 | * | 4/2003 | Murade | 349/111 |

* cited by examiner

*Primary Examiner*—Nathan J. Flynn
*Assistant Examiner*—Fazli Erdem

(57) ABSTRACT

A method of forming an active plate for a liquid crystal display using top gate TFTs is described. A black organic light shield layer (73) is used under the TFTs to shield the channel (91) of the TFTs from light passing through a substrate (71) from below. The active plate may be a high aperture plate having pixel electrodes (99) overlapping the row and column (79) conductors. The organic light shield layer may mask the gaps (102) between pixel electrodes.

11 Claims, 8 Drawing Sheets

6,888,587 B2

LIQUID CRYSTAL DISPLAYS

FIELD

This invention relates to active matrix liquid crystal displays, and particularly to the transistor substrate, known as the active plate, used in the manufacture of such a display.

BACKGROUND OF THE INVENTION

A liquid crystal display typically comprises an active plate and a passive plate between which liquid crystal material is sandwiched. The active plate comprises an array of transistor switching devices, typically with one transistor associated with each pixel of the display. Each pixel is also associated with a pixel electrode on the active plate to which a signal is applied for controlling the brightness of the individual pixel.

A large area of the active plate is at least partially transparent, and this is required because the display is typically illuminated by a back light. Mainly, the areas covered by the opaque row and column conductors are the only opaque parts of the plate. If the pixel electrode does not cover the transparent area, then there will be an area of liquid crystal material not modulated by the pixel electrode but which does receive light from the back light. This reduces the contrast of the display. A black mask layer is typically provided for shielding these areas of the active plate, and additionally to shield the transistors as their operating characteristics are light-dependent. Conventionally, the black mask layer is located on the passive plate of the active matrix cell. However, the overlap between the black mask layer and the pixel electrodes needs to be large in this case as a result of poor cell coupling accuracy. This overlap reduces the aperture of the display pixels, which reduces the power efficiency of the display. This is particularly undesirable for battery operated devices, such as portable products.

It has been proposed to use layers of the active plate to provide the required masking function. For example, one proposal is to define the pixel electrodes to overlap the row and column conductors, so that there is no gap between the row and column conductors and the pixel electrodes, which would otherwise need to be shielded. FIG. 1 illustrates the essential process steps for manufacturing an active plate in this way.

FIG. 1A shows a patterned gate conductor layer 10, which defines a transistor gate 12 which is connected to an associated row conductor 14. A gate insulator layer overlies the patterned gate conductor layer and a semiconductor layer is deposited over the insulated gate structure. The semiconductor layer is patterned to define the semiconductor body 16 of the transistor, as well as an insulator layer 18 to reduce capacitive coupling at the cross-over between row and column conductors. The patterned semiconductor layer 16,18 is shown in FIG. 1B.

A source and drain conductor layer is deposited and patterned over the silicon layer which defines a transistor source 20 connected to a column conductor 22, and a drain region 24. As shown in FIG. 1C, the region 18 provides insulation at the cross-over of the row 14 and column 22 conductors. The source and drain conductor layer also defines a capacitor top contact 26. This is a pixel charge storage capacitor defined by the row conductor 14, the gate insulator layer and the top contact 26.

As shown in FIG. 1D a passivation layer is deposited over the entire structure and through-holes 28, 30 are provided to enable connection through the passivation layer to the drain 24 and to the capacitor top contact 26. Finally, the pixel electrodes 32, 34 are deposited over the passivation layer with each pixel electrode making contact through the through-holes 28, 30 to a drain 24 of the associated switching transistor and to the top contact 26 of the pixel charged storage capacitor.

FIG. 2 shows the electrical components which make up the pixels shown in FIG. 1. The row conductor 14 is connected to the gate of the TFT 40, and the column electrode 22 is coupled to the source, as explained with reference to FIG. 1. The liquid crystal material provided over the pixel effectively defines a liquid crystal cell 42 which extends between the drain of the transistor 40 and a common ground plane 44. The pixel storage capacitor 46 is connected between the drain of the transistor 40 and the row conductor 14a associated with an adjacent row of pixels.

In the process described with reference to FIG. 1, the row and column electrodes are used to provide masking of the pixel. In particular, the overlap of the pixel electrodes 32 and 34 over the row and column conductors eliminates any gap which requires shielding. This means that there is no need to provide a black mask layer on the passive plate to define each pixel. Since a black mask layer on the passive plate cannot be aligned exactly with the pixels on the active plate a black mask layer on the passive plate would need to have a significant overlap with the row and column conductors. Therefore, the omission of the mask layer on the passive plate delivers a liquid crystal display in which each pixel has a large aperture.

Another way of providing a masking function on the active plate is described in U.S. Pat. No. 5,781,254 to Kim et al. Referring to FIG. 3, a transistor has a gate 12 is provided under a channel 16 connected between source 20 and drain 24. The drain is connected to a transparent pixel electrode 32. Row 14 and column 22 electrodes connect a plurality of transistors and pixel electrodes in an array. In this arrangement, an organic masking layer 48 is provided over the row and column electrodes, and the transistor region, as shown in FIG. 4.

U.S. Pat. No. 5,121,237 to Ikeda et al describes a liquid crystal display in which an organic mask layer is provided over a channel region of an active substrate to protect the channel region from light. The masking around the individual pixels is provided on the passive substrate. A further document disclosing the use of an organic mask layer to protect a thin film transistor structure is U.S. Pat. No. 5,703,668 to Shin et al. The mask layer is deposited above an oxide or nitride layer that covers the channel.

The structures described above are all "bottom gate" structures in which the gate 12 lies under the channel 16. An alternative form of structure is a top-gate structure in which the gate lies above the channel. One advantage of such a structure is that since the gate electrode lies on top of the transistor the material and thickness of the gate electrode may be selected with more freedom.

FIG. 5 illustrates a known top-gate structure in cross section. A metal light shield layer 53 is deposited on a transparent substrate 51 as will be explained below. A silicon dioxide layer is deposited to separate the rest of the structure from the metal layer 53. Then, a thin-film transistor (TFT) structure is deposited. Firstly, a transparent electrode layer 57 is provided to act as pixel electrodes 59. A column conductor 61 is deposited on this layer. An amorphous silicon (a-Si:H) layer 63 acting as source, drain and channel of the TFT is deposited, followed by first 65 and second 67 silicon nitride layers. A gate electrode 69 is deposited on top of the structure, and connected to row conductors (not shown).

The channel of the TFT may be photosensitive and so it is desirable to prevent light reaching it. The top gate may provide the necessary shielding from above. However, many liquid crystal displays are back-lit, i.e. lit from below, and so the metal layer 53 is patterned to be present under the TFT to shield the TFT from light from below.

Unfortunately, it is not possible to use the metal layer 53 that shields the TFT as a mask layer to prevent light passing through the liquid crystal display between pixels. This is because the mask layer would have to surround each pixel which would result in a continuous mesh covering the whole of the display. Such an electrically continuous mesh would lead to undesirable capacitative couplings with and between other conductors on the active substrate, leading to degradation of performance. Therefore in conventional LCD top-gate TFT devices a mask layer is provided on the passive plate to separate each pixel, as in conventional bottom-gate structures.

It would be beneficial if the mask layer could be eliminated. The structures discussed above, which are designed to eliminate the mask layers from bottom gate TFTs, provide mask layers over the bottom gate TFTs that both shield the channels of the TFTs and also act as mask layers. These structures are not suitable for top-gate TFTs, in which the top gate itself provides some shielding from light from above and it is instead light from below that needs to be prevented.

A further disadvantage of conventional top-gate TFT structures is that the metallic light shield layer is effectively a floating gate that can store charge and slowly leak it. The stored charge can affect the channel region of the TFT by variable amounts which can significantly affect the turn-on and turn-off voltages of the TFT. Since consistency of turn-on and turn-off voltages is important to the performance of the device, the floating gate effect of the light shield layer is highly detrimental. Accordingly, it would be of benefit if this effect could be minimized.

SUMMARY OF THE INVENTION

According to the invention there is provided an active plate for a liquid crystal display, comprising:

a transparent substrate, top gate thin-film transistors each having a source and a drain, a channel region connecting the source and drain and a top gate over the channel, pixel electrodes connected to the top gate thin-film transistors, and an organic light shield layer under the thin film transistors patterned to shield at least the channel regions of the top gate thin film transistors from light passing through the transparent substrate from below.

It is not a trivial matter to deposit TFT structures reliably on organic layers because in conventional TFT manufacture the deposition temperatures used are damaging to the underlying organic layers. However, suitable low temperature polysilicon processes are now available. These have been used to deposit EEPROMS on glass, as described in Young et al "The fabrication and characterization of EEPROM arrays on glass using a low temperature poly-Si TFT process", IEEE Trans Electron Dev, volume 43, number 11, p1930 (1996). These processes have also been used for active matrix liquid crystal displays, as demonstrated in Young et al "Thin-film-transistor- and diode-addressed AMLCDs on polymer substrates", Journal of the Society for Information Display, volume 5/3 p275 (1997).

What has not previously been realized, however, is that the use of these processes makes it possible to replace the conventional shield metallisation used in top gate TFT structures with an organic shield. The lower deposition temperatures allow poly-Si TFT structures to be deposited on top of an organic layer without damaging the organic layer.

Since the organic light shield layer is insulating the light shield does not function as a floating gate as was the case for prior art top-gate devices. This significantly increases the performance and reliability of the device.

Simply replacing the thin metallisation light shield layer of prior art top-gate TFT structures with an organic light shield layer causes difficulty. This is because although a metallisation layer can be opaque even when very thin it is necessary for an organic layer to be much thicker to have a comparable opacity. Accordingly, after the organic light shield layer is deposited it is preferred to deposit a planarisation layer on top of the opaque light shield layer to permit the TFT structure to be deposited on a substantially flat layer.

Normally, the active plate will have row and column conductors connected to the thin-film transistors. In embodiments, the pixel electrodes partially overlap the row and column electrodes. In this way, the row and column electrodes act as masks between the pixel electrodes to prevent light from the rear passing through regions between pixel electrodes. In a finished display device, liquid crystal in the regions between pixel electrodes is not controlled by voltage on the pixel electrodes; accordingly, light passing through these regions will not be modulated. Masking the gaps between the pixel electrodes prevents light passing through these unmodulated regions and so increases the contrast of the display.

As discussed above, in conventional devices this masking is carried out by a mask layer on the passive plate of a liquid crystal display. By overlapping the pixel electrodes with the row and column electrodes, the mask layer on the passive plate may be eliminated. This simplifies the manufacture of the passive plate. Moreover, the passive plate need not be precisely aligned with the active plate and so mask layers on a passive plate must have a significant overlap to allow for possible misalignment. By using the row and column electrodes on the active plate as masks, the alignment accuracy can be much improved and so less overlap is needed. This reduction in the amount of mask area needed increases the aperture of the device.

In embodiments, the organic light shield layer is patterned to overlap the pixel electrodes to shield the gaps between the pixel electrodes. This again provides masking of the gaps between pixel electrodes on the active plate and so again permits the mask to be omitted from the passive plate of the liquid crystal device.

In another aspect, the invention relates to an active matrix liquid crystal display comprising an active plate according to any preceding claim, a passive plate and a layer of liquid crystal sandwiched between the active and the passive plate for modulation by the pixel electrodes.

In a further aspect, there is provided a method of making an active plate for a liquid crystal display, comprising:

depositing and patterning a patterned organic light shield layer on a transparent insulating substrate, depositing a source, drain and channel layer above the patterned organic light shield layer, depositing an insulating layer at least over the source, drain and channel layer to act as a gate insulator layer, depositing and patterning a gate layer over the insulating layer, to form a plurality of thin film transistors each having a source, a drain, a channel and a gate, and forming a pixel electrode layer connected to one of the source and drain, wherein the organic light shield layer is patterned to shield at least the channel from light passing through the transparent substrate from below.

The pixel electrode layer may be provided before the TFT is formed, or afterwards.

The method may further comprise the step of depositing a planarisation layer on the organic light shield layer.

The method may further comprise the step of forming row and column conductors connected to the top-gate thin-film transistors and the pixel electrodes may be formed to partially overlap the row and column electrodes.

A top planarisation layer may be deposited over the top gate thin film transistors to define a plurality of vias over the top gate thin film transistors and the pixel electrodes may be provided on the top organic planarisation layer and connected to the thin film transistors through the vias.

The organic light shield layer may be patterned to be present under the gaps between adjacent pixel electrodes to shield the gaps between the pixel electrodes from light passing through the transparent substrate from below.

In a still further aspect, the invention relates to a method of forming an active matrix liquid crystal display comprising forming an active plate as described above, providing a passive plate and sandwiching a layer of liquid crystal between the active and the passive plates.

BRIEF DESCRIPTION OF THE DRAWINGS

For a better understanding of the invention and purely by way of example specific embodiments will now be described with reference to the accompanying drawings, in which.

DESCRIPTION OF THE PREFERRED EMBODIMENTS

Figure 1A:
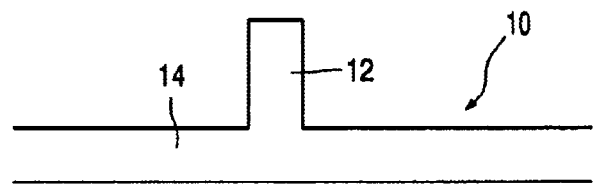
FIG. 1 shows the steps of a known method of manufacturing a bottom gate TFT liquid crystal display.
Figure 1B:
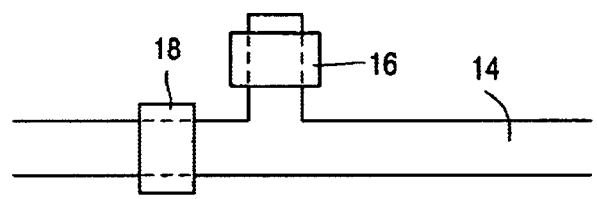
Figure 1C:
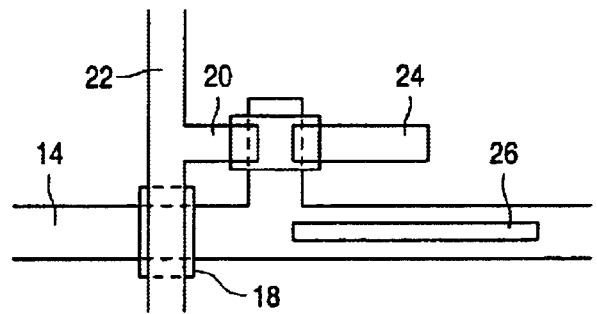
Figure 1D:
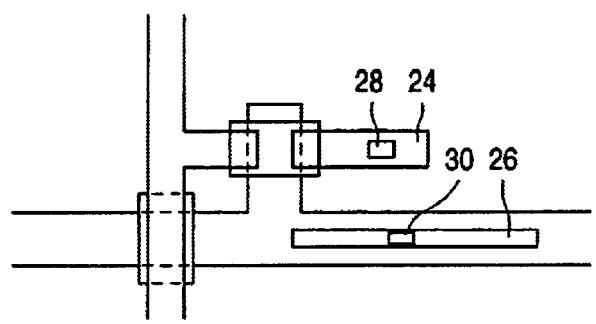
Figure 1E:
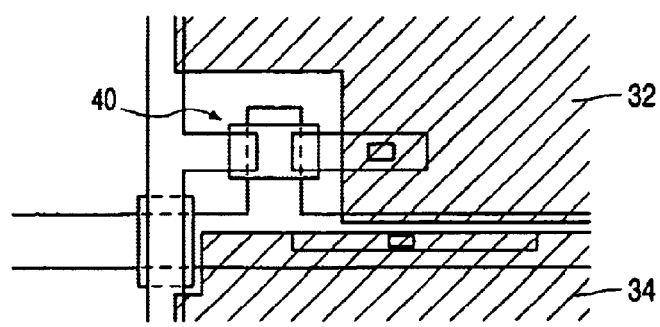
Figure 2:
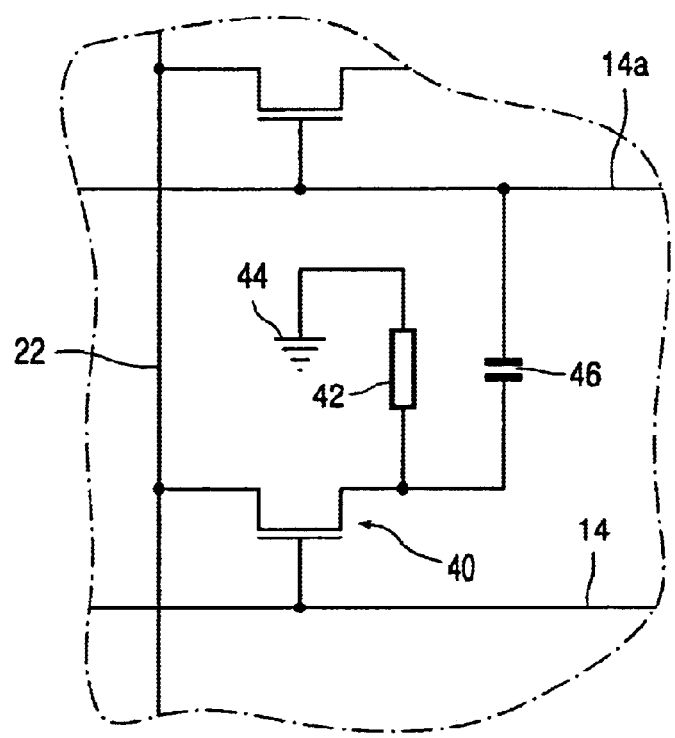
FIG. 2 shows a cell of the bottom gate TFT liquid crystal display of FIG. 1.
Figure 3:
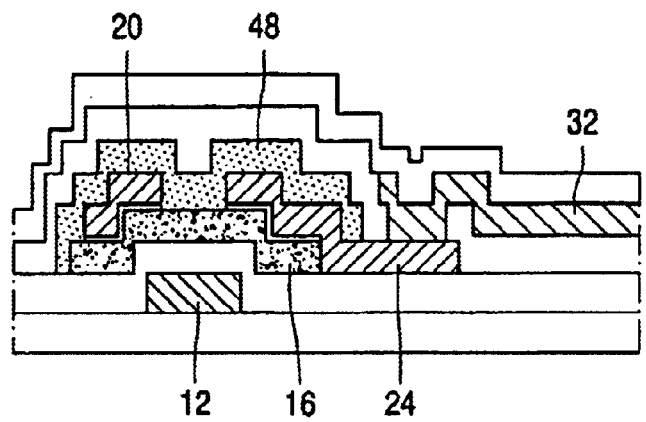
FIG. 3 is a side view of a known structure.
Figure 4:
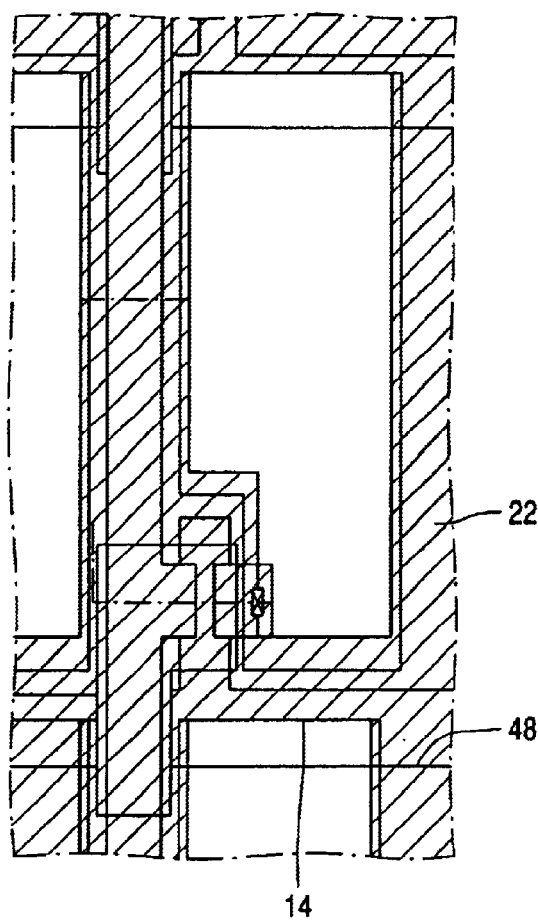
FIG. 4 is a top view of the structure of FIG. 3.
Figure 5:
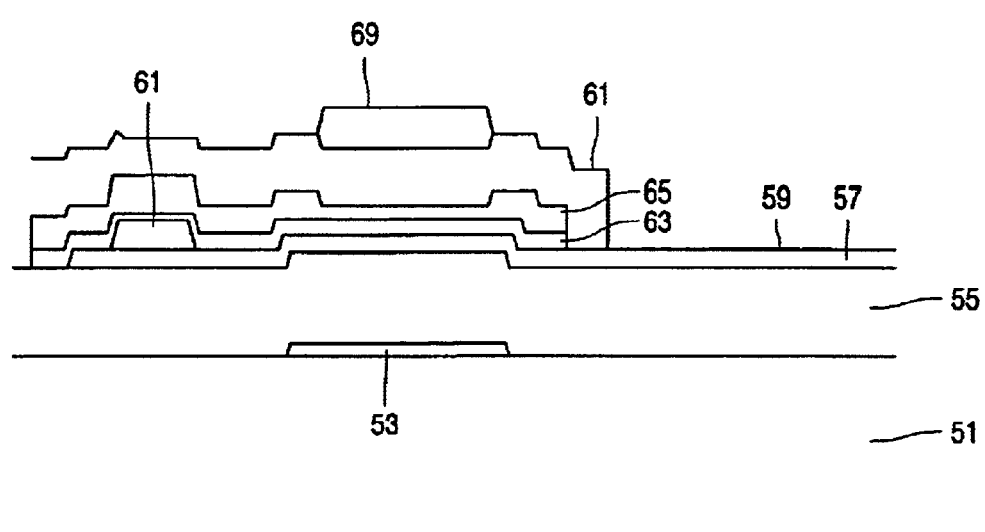
FIG. 5 shows a known top-gate TFT structure.
Figure 6A:
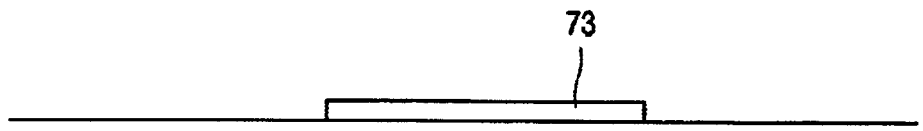
FIG. 6 shows the steps of a method of manufacturing an active substrate for a liquid crystal display according to a first embodiment of the invention.
Figure 6B:
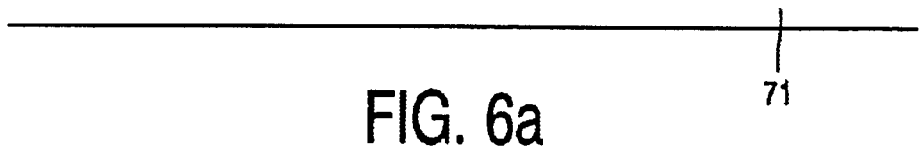
Figure 6C:
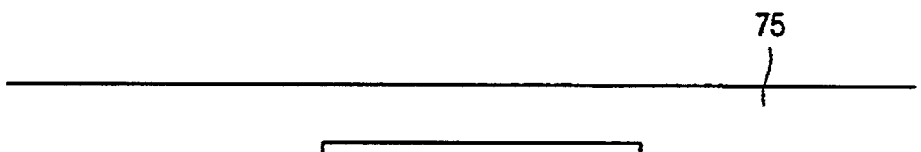
Figure 6D:
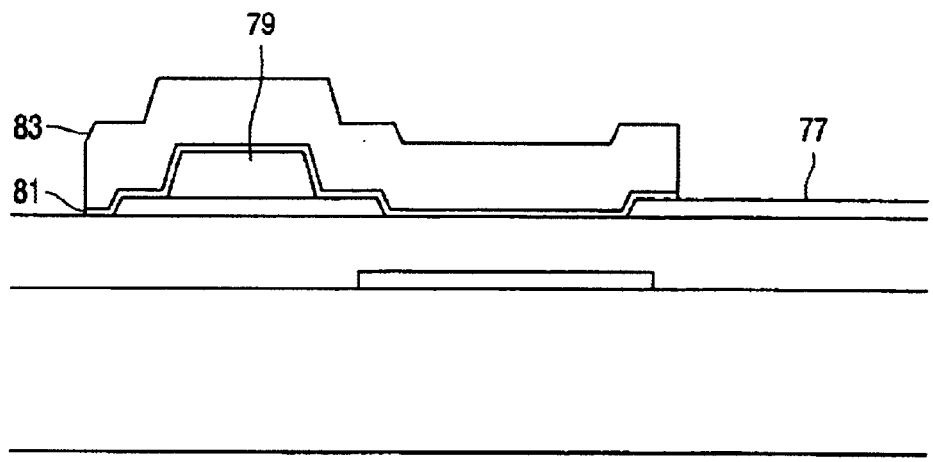
Figure 6E:
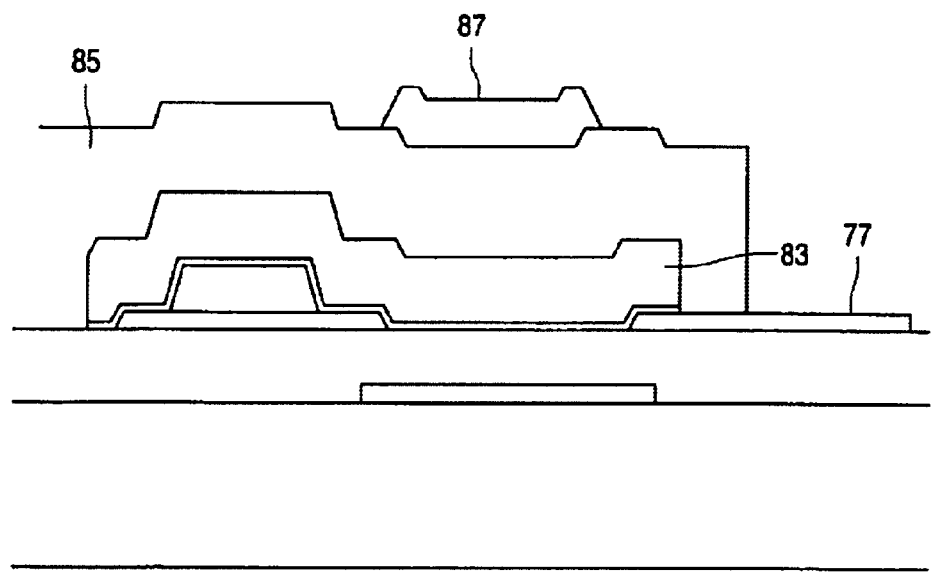
Figure 6F:
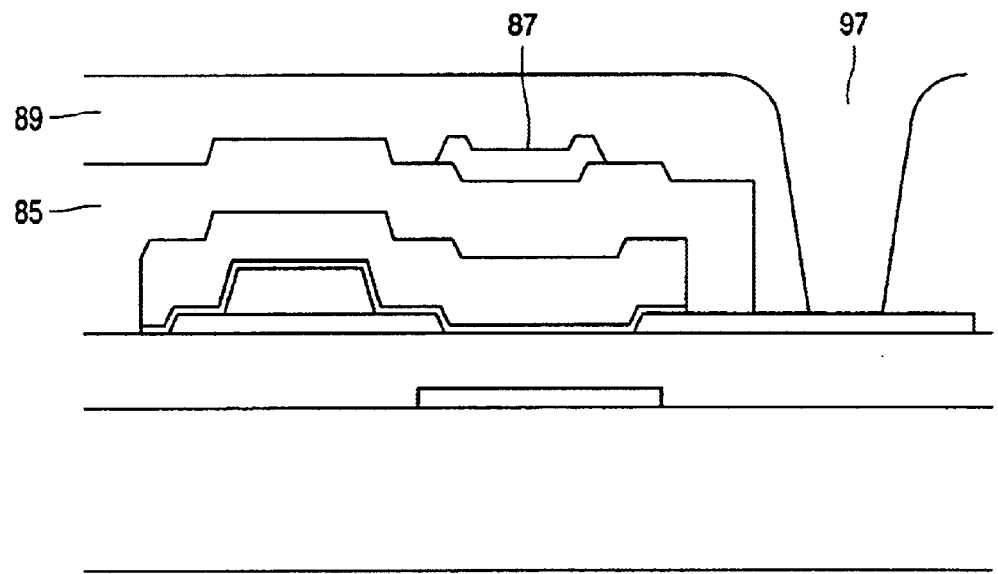
Figure 6G:
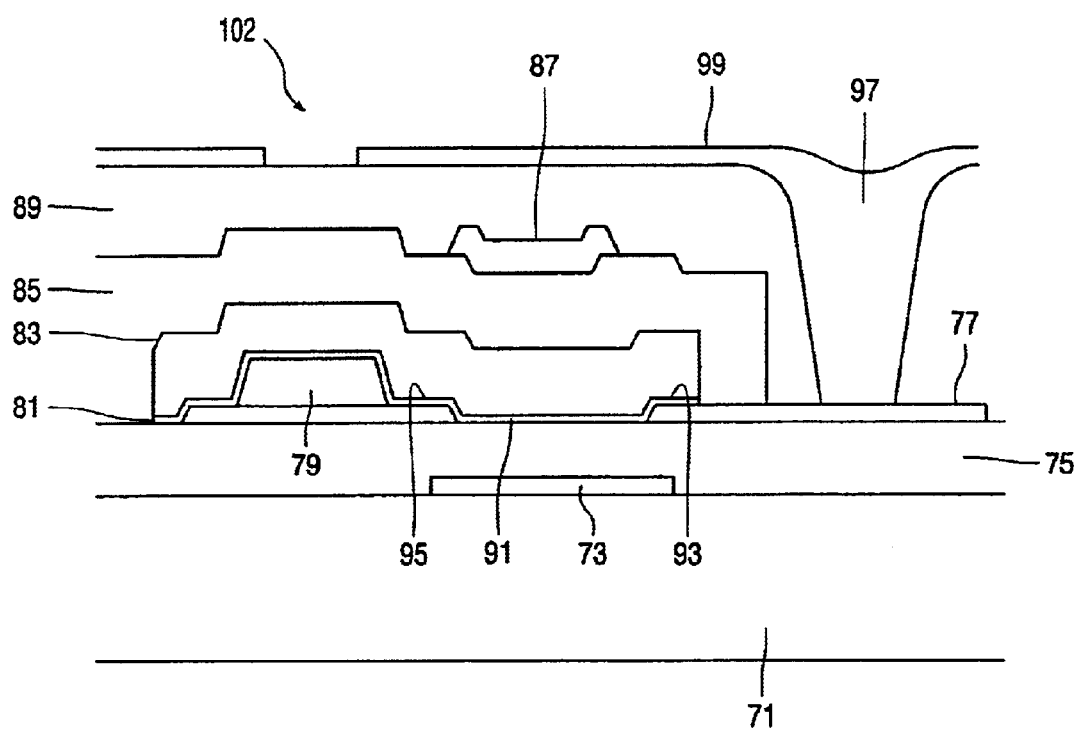

Referring to FIG. 6, an organic mask layer 73 is deposited on a transparent insulating substrate 71 and patterned to define an opaque mask shield layer. The opaque mask shield layer may be of an suitable opaque organic material, such as the photosensitive acrylic-based black resin described in Sabnis et al, proceedings of Asia Display 1998, page 1025. Other suitable organic mask layers are those described in U.S. Pat. No. 5,781,254 to Kim et al, U.S. Pat. No. 5,121,237 to Ikeda et al or U.S. Pat. No. 5,703,668 to Shin et al. The patterning may be carried out in any of a number of known ways. For example, photoresist may be deposited over the layer of organic mask shield layer and patterned. The shape of the pattern used will be described below. On top of the organic mask shield layer 73 a planarizing layer 75 is provided. A suitable planarising material, for example, is Benzo-Cyclo-Butene (BCB); many other planarising materials are known.

A transparent electrode layer 77 of Indium Tin Oxide is then deposited and patterned. Column conductors 79 are then provided, followed by an amorphous-silicon:hydrogen (aSi:H) layer. This is patterned to form the source, gate and drain of a thin film transistor (TFT). A first silicon nitride insulating layer 83 is then deposited and this layer and the amorphous silicon layer are patterned. A second silicon nitride insulating layer 85 is deposited and patterned over the top of the first silicon nitride insulating layer 83 and a gate electrode 87 is deposited and patterned over the second silicon nitride insulating layer 85.

The thin-film transistors are thus complete. The two silicon nitride insulating layers 83, 85 constitute the gate insulator, the channel 91 is constituted by the part of the amorphous silicon layer 81 below the gate electrode 87, and the source 95 and the drain 93 of the thin film transistor are constituted by the regions of the amorphous silicon layer 81 on either side of the channel region 91. The gate electrodes are connected to row electrodes 101 (FIG. 7) in a known way.

A further planarising layer 89 is then provided on top of the thin film transistor structures, and patterned to form vias 97 connecting to the electrodes 77. Pixel electrodes 99 are then deposited on the planarisation layer 89 and connected to the electrodes 77 through the vias 97.

It should be noted that the vertical scale in these drawings is strongly exaggerated for clarity. Although the via 97 appears to be a deep via, it is in reality shallow.

Figure 7:
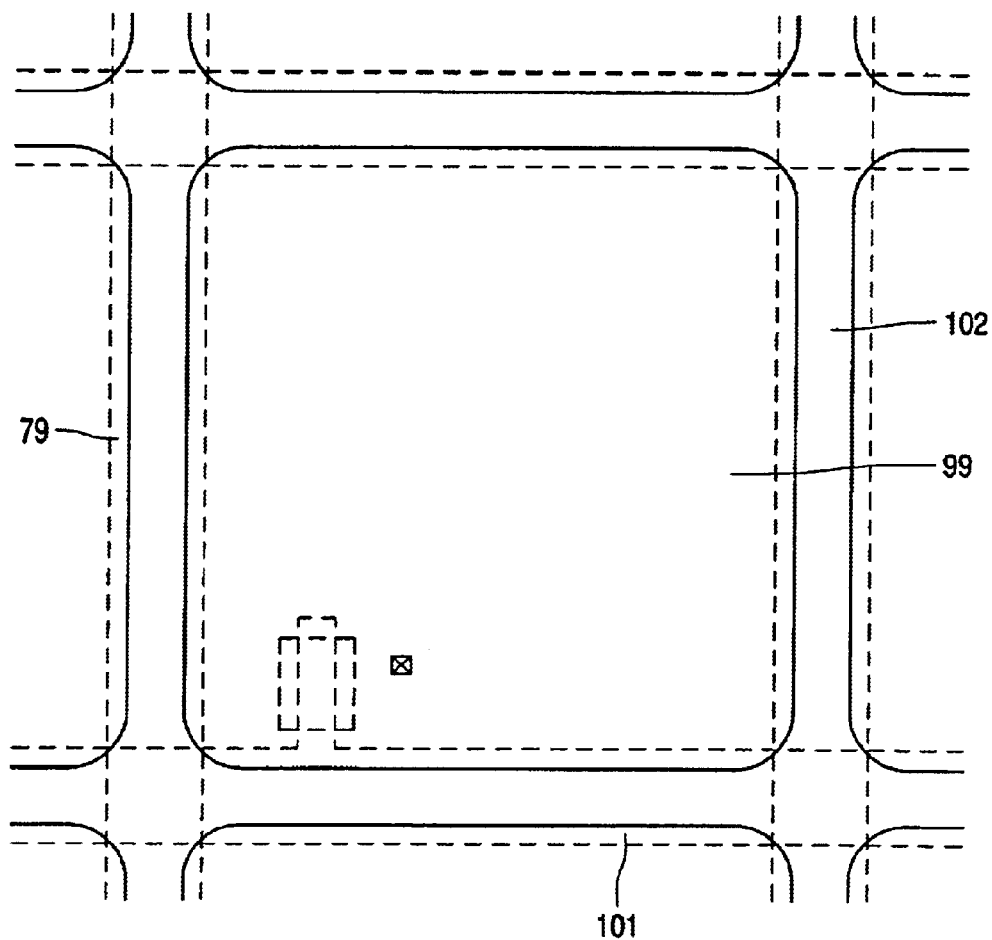
FIG. 7 shows a schematic top view of the active substrate of the first embodiment of the invention.

Referring to FIG. 7, it can be seen that the pixel electrode 99 overlaps the column 79 and row 101 electrodes, shown dotted in FIG. 7 since they are underneath the pixel electrodes 99. In this way, the row and column electrodes themselves provide the necessary masking of the gaps 102 between the pixel electrodes 99. The necessary shielding of the thin film channels from the backlight is provided by the organic light shield layer 73.

Figure 8:
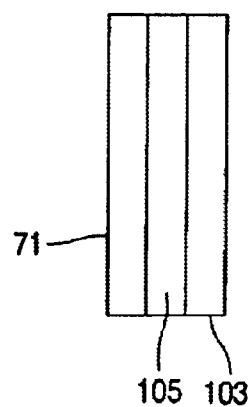
FIG. 8 illustrates a liquid crystal display using the active substrate of the first embodiment.

Referring to FIG. 8, the active substrate 71 and a passive substrate 103 are then arranged to sandwich a liquid crystal layer 105 to form the finished liquid display.

Figure 9:
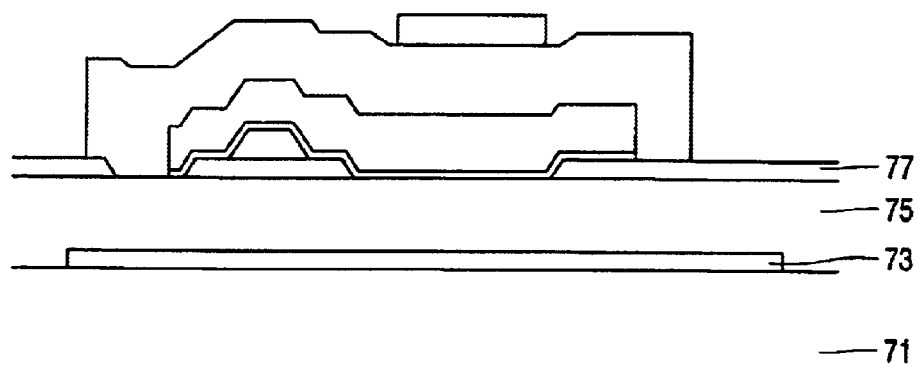
FIG. 9 shows a section through an active substrate according to a second embodiment of the invention.

In the above embodiment, the row and column electrodes provide the masking between pixel electrodes. In alternative embodiments, this function is provided by the organic light shield layer 73. Referring to FIG. 9, like components are shown with the same reference numerals as in FIG. 6. In this embodiment, the top planarisation layer 89 and pixel electrode 99 are omitted and the electrode 77 acts directly as the pixel electrode.

Figure 10:
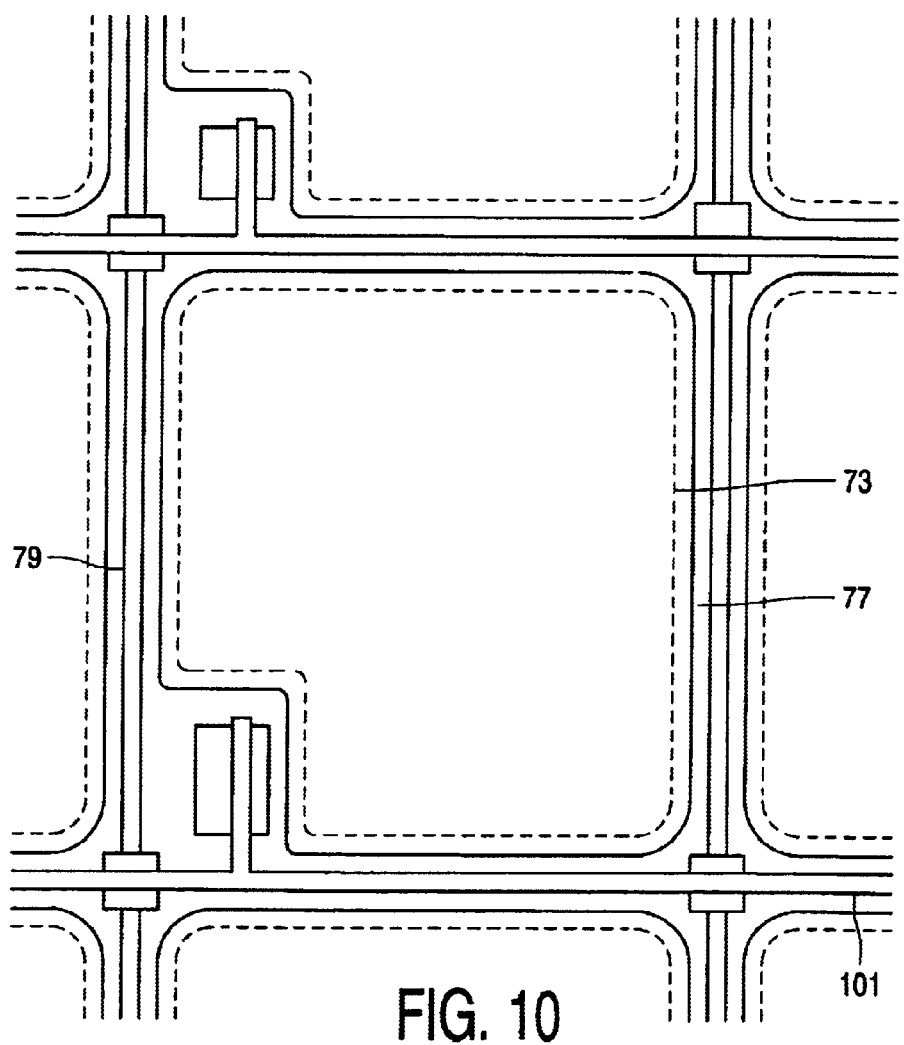
FIG. 10 shows a top view of the active substrate of the second embodiment.

The organic light shield layer 73 is patterned as shown in FIG. 10 (dotted) to overlap the edges of the pixel electrodes 77 so that the organic light shield layer 73 shields the gaps 102 between adjacent pixel electrodes and so provides the mask layer function.

The invention is not limited to the above-described embodiments and the organic light shield layer of the present invention may be used in any active plate of an active matrix liquid crystal display structure using top-gate thin film transistors.

What is claimed is:

1. An active plate for a liquid crystal display, comprising:

a transparent substrate;

top gate thin-film transistors each having a source and a drain, a channel region connecting the source and drain and a top gate over the channel;

pixel electrodes connected to the top gate thin-film transistors; and an organic light shield layer under the thin film transistors patterned to shield at least the channel regions of the top gate thin film transistors from light passing through the transparent substrate from below; and a planarisation layer over the organic light shield layer and under the top-gate thin-film transistors.

2. An active plate according to claim 1 further comprising row and column electrodes connected to the top gate thin-film transistors, wherein the pixel electrodes partially overlap the row and column electrodes.

3. An active plate according to claim 2 further comprising a top planarisation layer arranged over the top gate thin film transistors, wherein the top planarisation layer defines a plurality of vias over the thin film transistors and the pixel electrodes are provided on the top planarisation layer connected to the thin film transistors through the vias.

4. An active plate according to claim 1 wherein the organic light shield layer is patterned to be present under gaps between adjacent pixel electrodes to shield the gaps between the pixel electrodes from light passing through the transparent substrate from below.

5. An active matrix liquid crystal display comprising:

an active plate according to claim 1;

a passive plate; and a layer of liquid crystal sandwiched between the active and the passive plate for modulation by the pixel electrodes.

6. A method of making an active plate for a liquid crystal display, comprising:

depositing and patterning an organic light shield layer on a transparent insulating substrate;

depositing a source, drain and channel layer above the patterned organic light shield layer;

depositing an insulating layer at least over the source, drain and channel layer to act as a gate insulator layer;

depositing and patterning a gate layer over the insulating layer, to form a plurality of thin film transistors each having a source, a drain, a channel and a gate; and forming a pixel electrode layer connected to one of the source and drain;

wherein the organic light shield layer is patterned to shield at least the channel from light passing through the transparent substrate from below.

7. A method according to claim 6 further comprising the step of depositing a planarisation layer on the organic light shield layer.

8. A method according to claim 6 further comprising the step of forming row and column conductors connected to the top-gate thin-film transistors wherein the pixel electrodes are formed to partially overlap the row and column electrodes.

9. A method according to claim 8 further comprising depositing a top planarisation layer over the top gate thin film transistors, defining a plurality of vias over the top gate thin film transistors and depositing pixel electrodes on the top organic planarisation layer connected to the thin film transistors through the vias.

10. A method according to claim 6 including patterning the organic light shield layer to be present under the gaps between adjacent pixel electrodes to shield the gaps between the pixel electrodes from light passing through the transparent substrate from below.

11. A method of forming an active matrix liquid crystal display comprising forming an active plate using a method according to claim 6;

providing a passive plate; and sandwiching a layer of liquid crystal between the active and the passive plates.

* * * * *